US012743583B2

(12) United States Patent
Wang et al.

(10) Patent No.: US 12,743,583 B2
(45) Date of Patent: Sep. 22, 2026

(54) LONGFORM SPEAKER DIARIZATION BY PROMPTING MULTIMODAL LLM WITH CHUNK-WISE IN-CONTEXT SELF-ENROLLMENT

(71) Applicant: Google LLC, Mountain View, CA (US)

(72) Inventors: Quan Wang, Hoboken, NJ (US); Yiling Huang, Edgewater, NJ (US); Guanlong Zhao, Long Island City, NY (US)

(73) Assignee: Google LLC, Mountain View, CA (US)

(*) Notice: Subject to any disclaimer, the term of this patent is extended or adjusted under 35 U.S.C. 154(b) by 135 days.

(21) Appl. No.: 18/646,580

(22) Filed: Apr. 25, 2024

(65) Prior Publication Data

US 2025/0335711 A1 Oct. 30, 2025

(51) Int. Cl.
*G06F 40/284* (2020.01)
*G10L 15/06* (2013.01)
(Continued)

(52) U.S. Cl.
CPC .......... *G06F 40/284* (2020.01); *G10L 15/063* (2013.01); *G10L 15/07* (2013.01); *G10L 17/02* (2013.01)

(58) Field of Classification Search
CPC ..... G06F 40/284; G10L 15/063; G10L 15/07; G10L 17/02
See application file for complete search history.

(56) References Cited

U.S. PATENT DOCUMENTS 11,431,517 B1 8/2022 Lau et al.
11,545,134 B1 * 1/2023 Federico ............... G10L 13/033
(Continued)

FOREIGN PATENT DOCUMENTS

CN 117332247 * 12/2023
EP 4 123 471 * 1/2023

OTHER PUBLICATIONS

Machine translation for CN 117332247 (Year: 2023).*
(Continued)

*Primary Examiner* — Qian Yang
(74) *Attorney, Agent, or Firm* — Honigman LLP; Brett A. Krueger; Grant Griffith

(57) ABSTRACT

A method includes receiving a prompt including a textual diarization request and corresponding audio data characterizing a conversation between multiple speakers. The method also includes generating a sequence of audio encoding chunks based on the corresponding data. For each respective audio encoding chunk, the method includes using a trained large language model (LLM) generating corresponding diarization results based on the respective audio encoding chunk and the textual diarization request and generating a new audio cohort for the respective audio encoding chunk based on the corresponding diarization results. The corresponding diarization results include a speech recognition result that has one or more predicted terms. Each respective predicted term is associated with a corresponding speaker token representing a predicted identity of a respective speaker that spoke the respective predicted term. The trained LLM is conditioned on a prior audio cohort generated by the trained LLM for a prior audio encoding chunk.

20 Claims, 4 Drawing Sheets

(51) Int. Cl.
*G10L 15/07* (2013.01)
*G10L 17/02* (2013.01)

(56) References Cited

U.S. PATENT DOCUMENTS

| | | | | |
|---|---|---|---|---|
| 2023/0129467 | A1* | 4/2023 | Singh | G10L 15/1822<br>704/246 |
| 2024/0347064 | A1* | 10/2024 | Li | G06N 3/045 |
| 2024/0354514 | A1* | 10/2024 | Valstar | A61B 5/024 |
| 2025/0078842 | A1* | 3/2025 | Park | G10L 17/06 |

OTHER PUBLICATIONS

"Combining Speech Recognition and Diarization in one model" Marco Ramoni, Oct. 27, 2023.
"Detect different speakers in an audio recording" Google, Jan. 12, 2024.
"Enhancing Speaker Diarization with Large Language Models: A Contextual Beam Search Approach" Park et al. dated Sep. 14, 2023.
"Audio-visual Speaker Diarization for Media (Multimodality)" Leo Kim, Jan. 4, 2024.

* cited by examiner

LONGFORM SPEAKER DIARIZATION BY PROMPTING MULTIMODAL LLM WITH CHUNK-WISE IN-CONTEXT SELF-ENROLLMENT

TECHNICAL FIELD

This disclosure relates to longform speaker diarization by prompting multimodal LLM with chunk-wise in-context self-enrollment

BACKGROUND

Speaker diarization is the process of partitioning an input audio stream into homogenous segments according to speaker identity. In an environment with multiple speakers, speaker diarization answers the question "who is speaking when" and has a variety of applications including multimedia information retrieval, speaker turn analysis, audio processing, and automatic transcription of conversation, to name a few. For example, speaker diarization involves the task of annotating speaker turns in a conversation by identifying that a first segment of an input audio stream is attributable to a first human speaker (without particularly identifying who the first human speaker is), and a second segment of the input audio stream is attributable to a different second human speaker (without particularly identifying who the second human speaker is), a third segment of the input audio stream is attributable to the first human speaker, etc. Despite performance advances of speaker diarization models, diarization results still often include errors.

SUMMARY

One aspect of the disclosure provides a joint speech recognition and speaker diarization model that includes a tokenizer and a trained large language model (LLM). The tokenizer is configured to receive a prompt that includes a textual diarization request and corresponding audio data characterizing a conversation between multiple speakers and generate a sequence of audio encoding chunks based on the corresponding audio data. For each respective audio encoding chunk of the sequence of audio encoding chunks, the trained LLM is configured to generate corresponding diarization results based on the respective audio encoding chunk and the textual diarization request and generate a new audio cohort for the respective audio encoding chunk based on the corresponding diarization results. The corresponding diarization results include a speech recognition result that has one or more predicted terms. Each respective predicted term is associated with a corresponding speaker token that represents a predicted identity of a respective speaker that spoke the respective predicted term. The trained LLM is conditioned on a prior audio cohort generated by the trained LLM for a prior audio encoding chunk.

Implementations of the disclosure may include one or more of the following optional features. In some implementations, each respective audio encoding chunk includes multiple audio encodings. The tokenizer may be further configured to generate a sequence of text encoding based on the textual diarization request. Here, generating the corresponding diarization results is further based on the sequence of text encodings. In some examples, the prior audio cohort includes a matrix of audio speech snippets of one or more of the multiple speakers that spoke prior to the respective audio encoding chunk. The new audio cohort may include a matrix of audio speech snippets of one or more of the multiple speakers that spoke prior to the respective audio encoding chunk and during the respective audio encoding chunk.

In some implementations, the trained LLM is only capable of generating textual outputs. In these implementations, the joint speech recognition and speaker diarization model further includes an output layer configured to receive, as input, the corresponding diarization results, determine timestamps between the speech recognition results and the speaker tokens, and generate the new audio cohort based on the timestamps between the speech recognition results and the speaker tokens. The trained LLM may include a multimodal LLM. In some examples, the trained LLM includes frozen training parameters. The tokenizer may include an audio encoder and a text encoder.

One aspect of the disclosure provides a computer-implemented method that when executed on data processing hardware causes the data processing hardware to perform operations for performing longform speaker diarization by prompting a multimodal large language model. The operations include receiving, as input to a joint speech recognition and speaker diarization model, a prompt that includes a textual diarization request and corresponding audio data characterizing a conversation between multiple speakers. The operations also include generating, using a tokenizer of the joint speech recognition and speaker diarization model, a sequence of audio encoding chunks based on the corresponding audio data. For each respective audio encoding chunk of the sequence of audio encoding chunks, using a trained large language model (LLM), the operations include generating corresponding diarization results based on the respective audio encoding chunk and the textual diarization request and generating a new audio cohort for the respective audio encoding chunk. The corresponding diarization results include a speech recognition result that has one or more predicted terms. Each respective predicted term is associated with a corresponding speaker token that represents a predicted identity of a respective speaker that spoke the respective predicted term. The trained LLM is conditioned on a prior audio cohort generated by the trained LLM for a prior audio encoding chunk.

Implementations of the disclosure may include one or more of the following optional features. In some implementations, each respective audio encoding chunk includes multiple audio encodings. The operations may further include generating, using the tokenizer, a sequence of text encodings based on the textual diarization request. Here, generating the corresponding diarization results is further based on the sequence of text encodings. In some examples, the prior audio cohort includes a matrix of audio speech snippets of one or more of the multiple speakers that spoke prior to the respective audio encoding chunk. The new audio cohort includes a matrix of audio speech snippets of one or more of the multiple speakers that spoke prior to the respective audio encoding chunk and during the respective audio encoding chunk.

In some implementations, the trained LLM is only capable of generating textual outputs. In these implementations, using an output layer of the joint speech recognition and speaker diarization model, the operations further includes determining timestamps between the speech recognition results and the speaker tokens and generating the new audio cohort based on the timestamps between the speech recognition results and the speaker tokens. The trained LLM may include a multimodal LLM. In some examples, the trained LLM includes frozen training parameters. The tokenizer may include an audio encoder and a text encoder.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
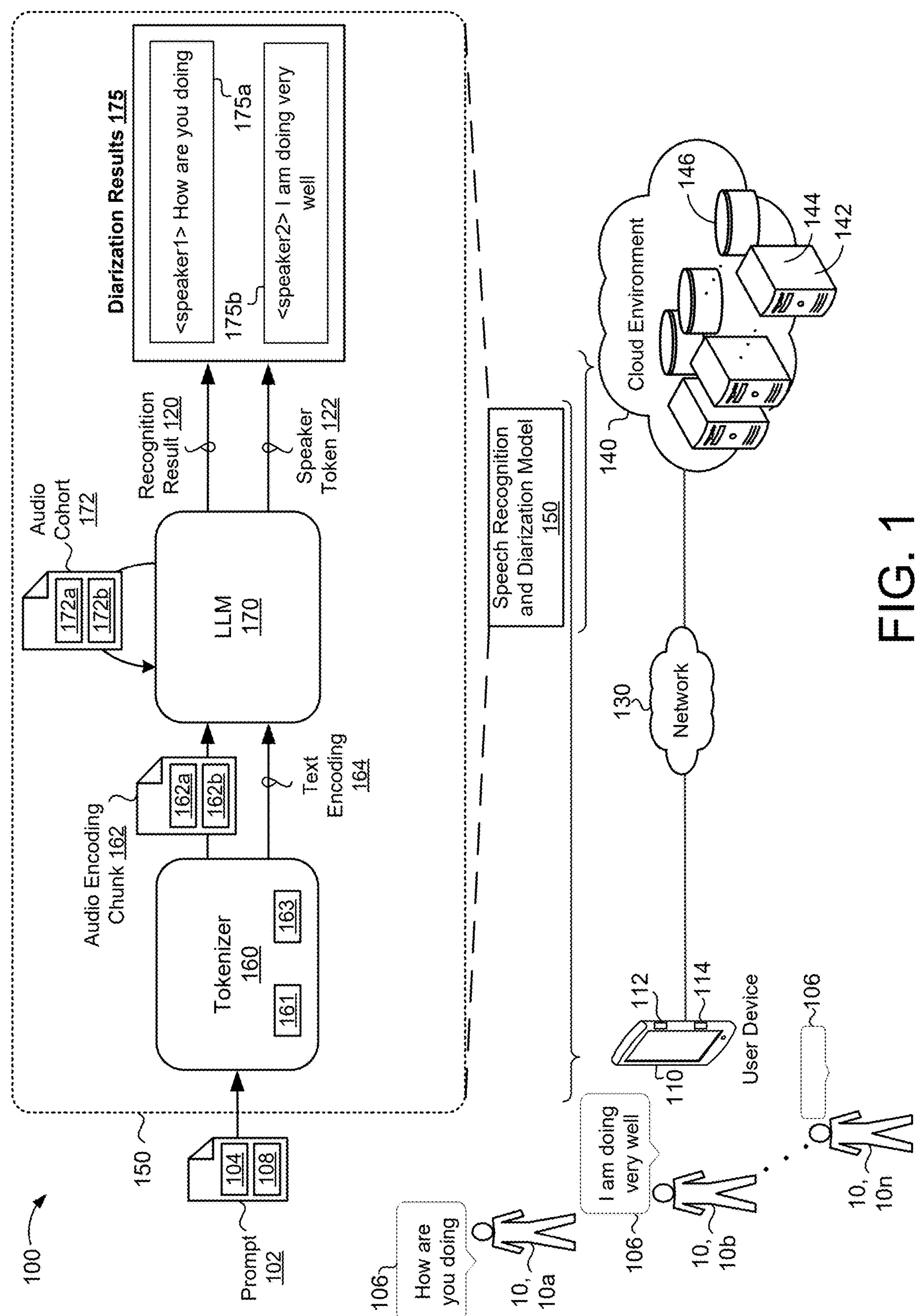
FIG. 1 is a schematic view of an example system that executes a joint speech recognition and speaker diarization model.

Automatic speech recognition (ASR) systems generally rely on speech processing algorithms that assume only one speaker is speaking in a given input audio signal. An input audio signal that includes a presence of multiple speakers can potentially disrupt these speech processing algorithms, thereby leading to inaccurate speech recognition results output by the ASR systems. As such, speaker diarization is the process of segmenting speech from a same speaker in a larger conversation not to specifically determine who is talking (e.g., speaker recognition/identification), but rather, determine when someone is speaking. Put another way, speaker diarization includes a series of speaker recognition tasks with short utterances that determines whether two segments of a given conversation were spoken by the same speaker or different speakers, and is repeated for all segments of the conversation. Accordingly, speaker diarization detects speaker turns from a conversation that includes multiple speakers. As used herein, the term 'speaker turn' refers to the transition from one individual speaking to a different individual speaking in a larger conversation.

Existing speaker diarization systems generally include multiple relatively independent components, such as, without limitation, a speech segmentation module, an embedding extraction module, and a clustering module. The speech segmentation module is generally configured to remove non-speech parts from an input utterance and divide the entire input utterance into fixed-length segments. Although dividing the input utterance into fixed-length segments is easy to implement, oftentimes, it is difficult to find a good segment length. That is, long fixed-length segments may include several speaker turns, while short segments include an insufficient number of speaker turns. The embedding extraction module is configured to extract, from each segment, a corresponding speaker-discriminative embedding. The speaker-discriminative embedding may include i-vectors or d-vectors. The clustering modules are tasked with determining the number of speakers present in the input utterance and assigning speaker identities (i.e., labels) to each segment. These clustering models may use popular clustering algorithms that include Gaussian mixture models, mean shift clustering, agglomerative hierarchical clustering, k-means clustering, links clustering, and spectral clustering.

One significant drawback of these existing speaker diarization systems is that the speaker-discriminative embeddings are not representative of speech variations of speakers throughout a conversation. For example, at the beginning of an hour-long interview, a speaker may be nervous and speak differently than at the end of the interview when that same speaker speaks more comfortably. In this example, existing speaker diarization systems may simply store a speaker-discriminative embedding representing the voice of the speaker during the beginning of the interview or the last time the speaker spoke, and thus, may not be able to accurately identify that the same speaker speaking more comfortably later in the interview. Another significant drawback of these existing speaker diarization systems is that some regulations preclude diarization systems from computing speaker-discriminative embedding of any kind, let alone storing and using speaker-discriminative speaker embeddings to perform speaker diarization.

Accordingly, implementations herein are directed towards a joint speech recognition and speaker diarization model that includes a tokenizer and a trained large language model (LLM). The tokenizer is configured to receive a prompt that includes a textual diarization request and corresponding audio data characterizing a conversation between multiple speakers. The tokenizer is also configured to generate a sequence of audio encoding chunks based on the corresponding audio data. For each respective audio encoding chunk, the trained LLM is configured to generate corresponding diarization results based on the respective audio encoding chunk and the textual diarization request and generate a new audio cohort for the respective audio encoding chunk based on the corresponding diarization results. The corresponding diarization results include a speech recognition result that has one or more predicted terms. Each respective predicted term is associated with a corresponding speaker token representing a predicted identity of a respective speaker that spoke the respective predicted term. Moreover, the trained LLM is conditioned on a prior audio cohort generated by the trained LLM for a prior audio encoding chunk.

Referring to FIG. 1, a system 100 includes a user device 110 capturing speech utterances 106 spoken by multiple speakers (e.g., users) 10, 10*a-n* during a conversation and communicating with a remote system 140 via a network 130. The remote system 140 may be a distributed system (e.g., cloud computing environment) having scalable/elastic resources 142. The resources 142 include computing resources 144 (e.g., data processing hardware) and/or storage resources 146 (e.g., memory hardware). The user device 110 and/or the remote system 140 executes a joint speech recognition and speaker diarization model 150 that is configured to receive a prompt 102 that includes a textual diarization request 104 and sequence of acoustic frames (i.e., audio data) 108 that corresponds to captured speech utterances 106 spoken by the multiple speakers 10 during the conversation. The textual diarization request 104 may include a sequence of text that requests the joint speech recognition and speaker diarization model 150 to perform speech recognition and/or speaker diarization on the audio data 108. For example, the textual diarization request 104 may correspond to "transcribe and diarize the following audio" whereby 'the following audio' refers to the audio data 108 from the prompt 102. One of the speakers 10, or another user of the system 100, may provide the textual diarization request 104 to the user device 110 using a keyboard of the user device 110 or by speaking a command that the user device 110 transcribes into the textual diarization request 104. The joint speech recognition and speaker diarization model 150 may include a tokenizer 160 and a trained large language model (LLM) 170. The joint speech recognition and speaker diarization model 150 is configured to generate diarization results 175 based on the prompt 102. The diarization results 175 include speech recognition results (e.g., speech recognition hypotheses or transcriptions) 120 and speaker tokens 122. As will become apparent, the speech recognition results 120 indicate "what" was spoken during the conversation and the speaker tokens 122 indicate "who" spoke each word/wordpiece of the speech recognition results 120.

The user device 110 includes data processing hardware 112 and memory hardware 114. The user device 110 may include an audio capture device (e.g., microphone) for capturing and converting the speech utterances 106 (also referred to as simply "utterances 106") from the multiple speakers 10 into the sequence of acoustic frames 108 (e.g., input audio data). In some implementations, the user device 110 is configured to execute a portion of the joint speech recognition and speaker diarization model 150 locally (e.g., using the data processing hardware 112) while a remaining portion of the joint speech recognition and speaker diarization model 150 executes on the cloud computing environment 140 (e.g., using data processing hardware 142). Alternatively, the joint speech recognition and speaker diarization model 150 may execute entirely on the user device 110 or the cloud computing environment 140. The user device 110 may be any computing device capable of communicating with the cloud computing environment 140 through the network 130. The user device 110 includes, but is not limited to, desktop computing devices and mobile computing devices, such as laptops, tablets, smart phones, smart speakers/displays, smart appliances, internet-of-things (IoT) devices, and wearable computing devices (e.g., headsets and/or watches).

In the example shown, the multiple speakers 10 and the user device 110 may be located within an environment (e.g., a room) where the user device 110 is configured to capture and convert the speech utterances 106 spoken by the multiple speakers 10 into the sequence of acoustic frames 108. For instance, the multiple speakers 10 may correspond to co-workers having a conversation during a meeting and the user device 110 may record and convert the speech utterances 106 into the sequence of acoustic frames 108. In turn, the user device 110 may provide the prompt 102 that includes the textual diarization request 104 and the sequence of acoustic frames 108 to the joint speech recognition and speaker diarization model 150 to generate the diarization results 175. In other examples, the sequence of acoustic frames 108 corresponds to a video or audio file of a conversation with multiple speakers. In these other examples, the sequence of acoustic frames 108 may be stored on the memory hardware 114, 144 of the user device 110 and/or the cloud computing environment 140.

In some examples, at least a portion of the speech utterances 106 conveyed in the sequence of acoustic frames 108 are overlapping such that, at a given instant in time, two or more speakers 10 are speaking simultaneously. Notably, a number N of the multiple speakers 10 may be unknown when the sequence of acoustic frames 108 are provided as input to the joint speech recognition and speaker diarization model 150 whereby the joint speech recognition and speaker diarization model 150 predicts the number N of the multiple speakers 10. In some implementations, the user device 110 is remotely located from the one or more of the multiple speakers 10. For instance, the user device 110 may include a remote device (e.g., network server) that captures speech utterances 106 from the multiple speakers 10 that are participants in a phone call or video conference. In this scenario, each speaker 10 would speak into their own user device 110 (e.g., phone, radio, computer, smartwatch, etc.) that captures and provides the speech utterances 106 to the remote user device for converting the speech utterances 106 into the sequence of acoustic frames 108. Of course in this scenario, the speech utterances 106 may undergo processing at each of the user devices 110 and be converted into a corresponding sequence of acoustic frames 108 that are transmitted to the remote user device which may additionally process the sequence of acoustic frames 108 provided as input to the joint speech recognition and speaker diarization model 150.

In some examples, the joint speech recognition and speaker diarization model 150 includes the tokenizer 160 that is configured to generate a sequence of audio encoding chunks 162 and a sequence of a sequence of text encodings 164 based on the prompt 102. More specifically, the tokenizer 160 includes an audio encoder 161 that generates the sequence of audio encoding chunks 162 based on the audio data 108 of the prompt 102. Thus, the audio encoder 161 encodes the audio data 108 and chunks the encoded audio data 108 into the sequence of audio encoding chunks 162. Each respective audio encoding chunk 162 includes multiple audio encodings. For example, the tokenizer 160 may generate a sequence of audio encoding chunks 162 for audio data 108 corresponding to a one-hour conversation whereby each respective audio encoding chunk 162 represents thirty (30) seconds of audio encodings from the one hour conversation. The tokenizer 160 also includes a text encoder 163 that generates the sequence of text encodings 164 based on the textual diarization request 104. The tokenizer 160 transmits the sequence of audio encoding chunks 162 and the sequence of text encodings 164 to the trained LLM 170. However, in some configurations, the tokenizer 160 is optional such that the joint speech recognition and speaker diarization model 150 omit the tokenizer 160. In these configurations, the trained LLM 170 directly receives the prompt 102 including the textual diarization request 104 and the audio data 108 in lieu of receiving the sequence of audio encoding chunks 162 and the sequence of text encodings 164 from the tokenizer 160.

The trained LLM 170 includes a trained neural network model. For instance, the trained LLM 170 may include the Pathways Language Model 2 (PALM 2). In some examples, the trained LLM 170 includes a multimodal LLM. That is, the trained LLM 170 may be capable of processing multimodal inputs (e.g., text, audio, images, etc.) and generating multimodal outputs (e.g., text, audio, images, etc.). The trained LLM 170 may include frozen training parameters such that the joint speech recognition and speaker diarization model 150 is unable to further train or fine-tune the trained LLM 170 to perform speech recognition or speaker diarization. For each respective audio encoding chunk 162 of the sequence of audio encoding chunks 162, the trained LLM 170 generates corresponding diarization results 175 based on the respective audio encoding chunk 162 and the textual diarization request 104. Notably, when generating the corresponding diarization results 175 for each respective audio encoding 162, the trained LLM 170 is conditioned on a prior audio cohort 172 generated by the trained LLM 170 for a prior audio encoding chunk 162 (e.g., prior to the respective audio encoding chunk 162).

Discussed in greater detail below, the audio cohort 172 includes a matrix of audio speech snippets of speakers 10 that spoke prior to the respective audio encoding chunk 162. For example, the audio cohort 172 may include "speaker1 samples <audio1> and speaker2 samples: <audio2>" where "<audio1>" and "<audio2>" represent audio speech snippets of a first speaker 10 and a second speaker 10, respectively. In this example, the text of "speaker 1 samples" and "speaker2 samples" indicates to the trained LLM 170 that the audio cohort 172 includes sample speech of the speakers 10. As such, the prior audio cohort 172 provides reference audio data of speakers 10 that spoke prior to the respective audio encoding chunk 162. Thus, the trained LLM 170 uses the prior audio cohort 172 to determine whether the respective audio encoding chunk 162 includes speech from any new speakers 10 and/or speakers 10 that spoke prior to the respective audio encoding chunk 162. In particular, the trained LLM 170 may determine whether each respective audio encoding chunk 162 includes speech by a new speaker that has not spoken prior to the respective audio encoding chunk 162, an existing speaker that has spoke prior to the respective audio encoding chunk 162, or some combination thereof.

The diarization results 175 generated by the LLM 170 for each respective audio encoding chunk 162 include speech recognition results 120 and speaker tokens 122. The speech recognition results 120 include one or more predicted terms each representing a transcription of "what" was spoken by the speakers 10 for the respective audio encoding chunk 162. Moreover, the trained LLM 170 generates a corresponding speaker token 122 in association with each respective predicted term representing a predicted identity of a respective speaker 10 that spoke the respective predicted term. For instance, the speaker token 122 may indicate that a first speaker 10 spoke one or more of the predicted terms.

In the example shown, the joint speech recognition and speaker diarization model 150 receives a respective prompt 102 that includes a textual diarization request 104 and corresponding audio data 108 for a conversation of "how are you doing I am doing very well" between a first speaker 10, 10*a* and a second speaker 10, 10*b*. The tokenizer 160 generates the sequence of two (2) audio encoding chunks 162*a*, 162*b* based on the corresponding audio data 108 and the sequence of text encodings 164 based on the textual diarization request 104. This example includes two audio encoding chunks 162 for the sake of clarify only as the tokenizer 160 may generate any number of audio encoding chunks 162. Continuing with the example shown, the trained LLM 170 generates a first corresponding speech recognition result 120 of "how are you doing" and first speaker tokens 122 indicating that the first speaker 10*a* spoke the first corresponding speech recognition result 120 based on the first audio encoding chunk 162*a*. Here, the first corresponding speech recognition result 120 and the first speaker tokens 122 are collectively referred to as first diarization results 175, 175*a*. Notably, since there are no audio encoding chunks 162 prior to the first audio encoding chunk 162*a*, the prior audio cohort 172 that the trained LLM 170 is conditioned on may include null values. Moreover, the trained LLM 170 generates a new audio cohort (e.g., first audio cohort 172, 172*a*) based on the first diarization results 175*a*. The first audio cohort 172*a* includes audio speech snippets of the first speaker 10*a* that spoke during the first audio encoding chunk 162*a*. For instance, the audio speech snippets may include all audio, or a portion thereof, of the first speaker 10*a* speaking "how are you doing." The first audio cohort 172*a* may also include associated text that instructs the trained LLM 170 that the first audio cohort 172*a* includes speech samples to leverage during diarization. For example, the first audio cohort 172*a* may include "given these speaker samples-speaker 1 samples <audio1>" where <audio1> includes speech snippets from the first speaker 10*a*.

Continuing with the example shown, the trained LLM 170 generates a second corresponding speech recognition result 120 of "I am doing very well" and second speaker tokens 122 indicating that the second speaker 10*b* was speaking based on the second audio encoding chunk 162*b*. Here, the second corresponding speech recognition result 120 and the second speaker tokens 122 are collectively referred to as second diarization results 175, 175*b*. Notably, when generating the second diarization results 175*b*, the trained LLM 170 is conditioned on a prior audio cohort (e.g., the first audio cohort 172*a*) generated by the trained LLM 170 for the first audio encoding chunk 162*a*. Moreover, the trained LLM 170 generates another new audio cohort (e.g., second audio cohort 172, 172*b*) based on the second diarization results 175*b*. The second audio cohort 172*b* includes the audio speech snippets of the first speaker 10*a* that spoke during the first audio encoding chunk 162*a* and audio speech snippets of the second speaker 10*b* that spoke during the second audio encoding chunk 162*b*. That is, the trained LLM 170 generates the second audio cohort 172*b* by adding speech snippets from the second audio encoding chunk 162*b* to the first audio cohort 172*a*. The second audio cohort 172*b* may also include associated text that instructs the trained LLM 170 that the second audio cohort 172*b* includes speech samples to leverage during diarization. For example, the second audio cohort 172*b* may include "given these speaker samples-speaker1 samples <audio1> and speaker2 samples <audio2>" where <audio1> includes speech snippets from the first speaker 10*a* and <audio2> includes speech snippets from the second speaker 10*b*. As such, the audio cohort 172 continues to grow as the trained LLM 170 processes each audio encoding chunk 152 from the sequence of audio encoding chunks 152. As a result, the trained LLM 170 outputs first diarization results 175*a* of "<speaker1> how are you doing" and second diarization results 175*b* of "<speaker 2> I am doing very well" where <speaker1> and <speaker2> represent speaker tokens 122 indicating that the first and second speakers 10*a*, 10*b* spoke, respectively.

The trained LLM 170 generates each new audio cohort 172 by determining whether the corresponding audio encoding chunk 162 includes speech from a new speaker 10, an existing speaker 10, or some combination thereof. The trained LLM 170 determines whether any new speakers 10 spoke by comparing the corresponding audio encoding chunk 162 to the prior audio cohort 172. When the trained LLM 170 determines the corresponding audio encoding chunk 162 represents speech spoken by a new speaker 10, the trained LLM 170 stores an association between the audio data spoken by the new user 10 and the new user 10 at the new audio cohort 172. On the other hand, when the trained LLM 170 determines the corresponding audio encoding chunk 162 represents speech spoken by an existing speaker 10, the trained LLM 170 adds the audio data spoken by the existing speaker 10 to the new audio cohort 172. That is, the trained LLM 170 adds additional audio data spoken by the existing speaker 10 to the new audio cohort 172.

Since the joint speech recognition and speaker diarization model 150 uses the trained LLM 170 that includes frozen training parameters, the joint speech recognition and speaker diarization model 150 may not further train or fine-tune the trained LLM 170 to perform joint speech recognition and speaker diarization. To that end, the joint speech recognition and speaker diarization model 150 generates a new audio cohort 172 for each respective audio encoding chunk 162 which the trained LLM 170 is conditioned on while processing a subsequent audio encoding chunk 162. By conditioning the trained LLM 170 in this manner, the trained LLM 170 is able to reference prior audio samples for speakers 10 that spoke prior to the respective audio encoding chunk 162 to generate diarization results 175 without being specifically trained to perform speaker diarization.

Figure 2:
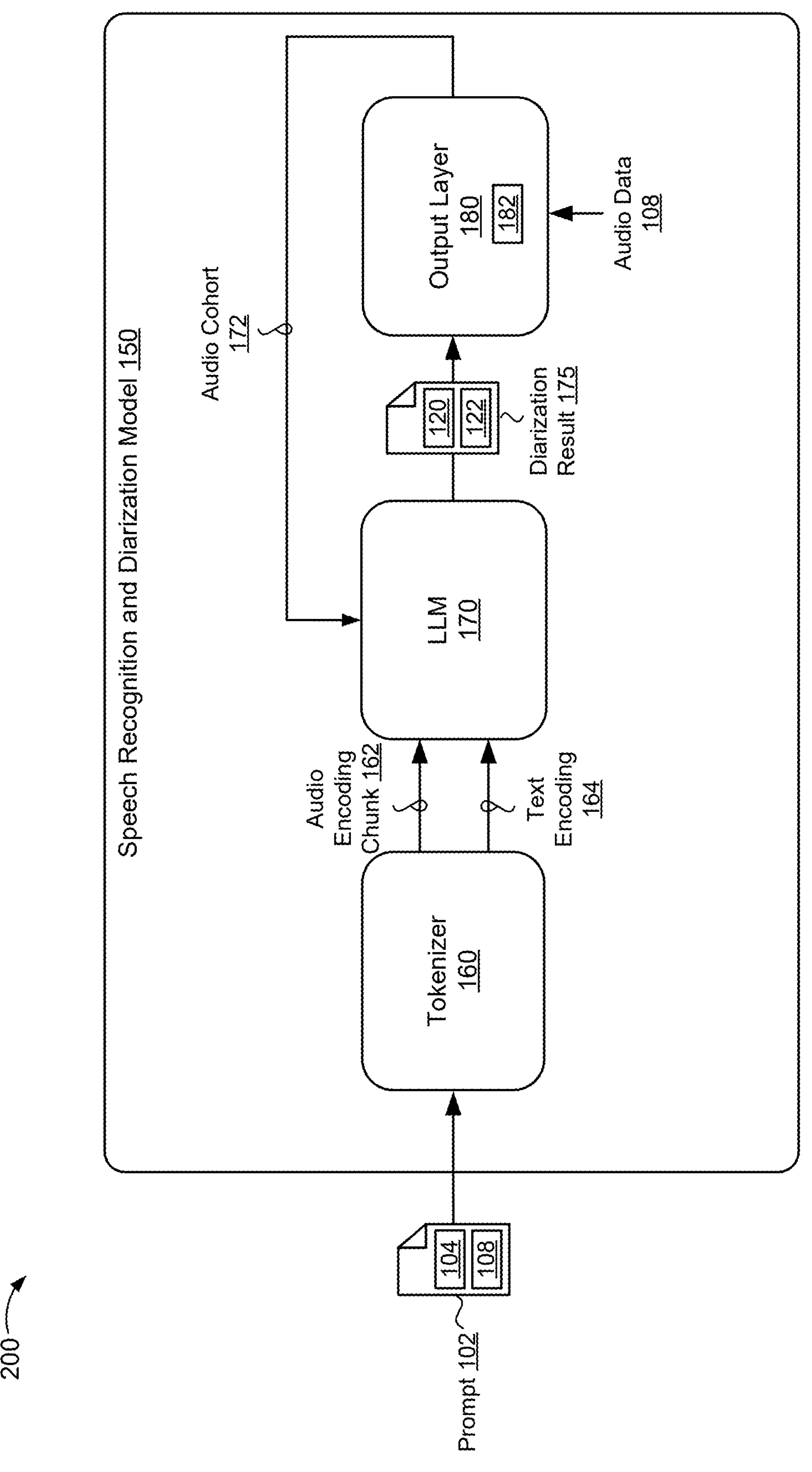
FIG. 2 is a schematic view of an example training process for training the joint speech recognition and speaker diarization model.

FIG. 2 shows an example configuration 200 of the joint speech recognition and speaker diarization model 150 where the trained LLM 170 is only capable of generating textual outputs. For instance, the trained LLM 170 may be unable to generate audio or image outputs. Alternatively, a downstream application may constrain the trained LLM 170 to only output textual outputs despite the capability of the trained LLM 170 to generate multimodal outputs. Accordingly, in these scenarios, the trained LLM 170 does not output the new audio cohort 172 since the audio cohort 172 includes audio speech snippets (e.g., audio data). To that end, the joint speech recognition and speaker diarization model 150 implements an the output layer 180 to generate the new audio cohort 172 in lieu of the trained LLM 170 generating the new audio cohort 172.

For instance, the tokenizer 160 receives the prompt 102 including the textual diarization request 104 and the corresponding audio data 108 and generates the corresponding sequence of audio encoding chunks 162 and the sequence of text encodings 164. Thereafter, the trained LLM 170, conditioned on the prior audio cohort 172, generates the diarization results 175 for each audio encoding chunk of the sequence audio encoding chunks 162. The diarization results 175 include the speech recognition result 120 and the speaker tokens 122. For each respective audio encoding chunk 162, the output layer 180 is configured to receive, as input, the diarization results 175 and the corresponding audio data 108 and generate the new audio cohort 172. The output layer 180 provides the new audio cohort 172 as feedback to the trained LLM 170. In particular, the output layer 180 may determine timestamps 182 between the speech recognition results 120 and the speaker tokens 122. Thus, the timestamps 182 may correlate particular time periods from the audio data 108 when a particular one of the speakers 10 was speaking. For example, the output layer 180 may determine timestamps 182 indicating that the first speaker 10*a* spoke from [3.2-5.4] of the audio data 108. Thereafter, the output layer 180 extracts audio speech snippets for the one or more speakers 10 using the timestamps 182 to generate the new audio cohort 172. Continuing with the above example, the output layer 180 would extract segment of audio data corresponding to the [3.2-5.4] timestamps 182 and store this extracted audio data in association with the first speaker 10*a*. As such, the output layer 180 is configured to generate the new audio cohort 172 due to configurations when the trained LLM 170 only generates textual outputs.

Figure 3:
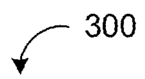
FIG. 3 is a flowchart of an example arrangement of operations for a computer-implemented method of performing longform speaker diarization by prompting a multimodal large language model.
Figure 3:
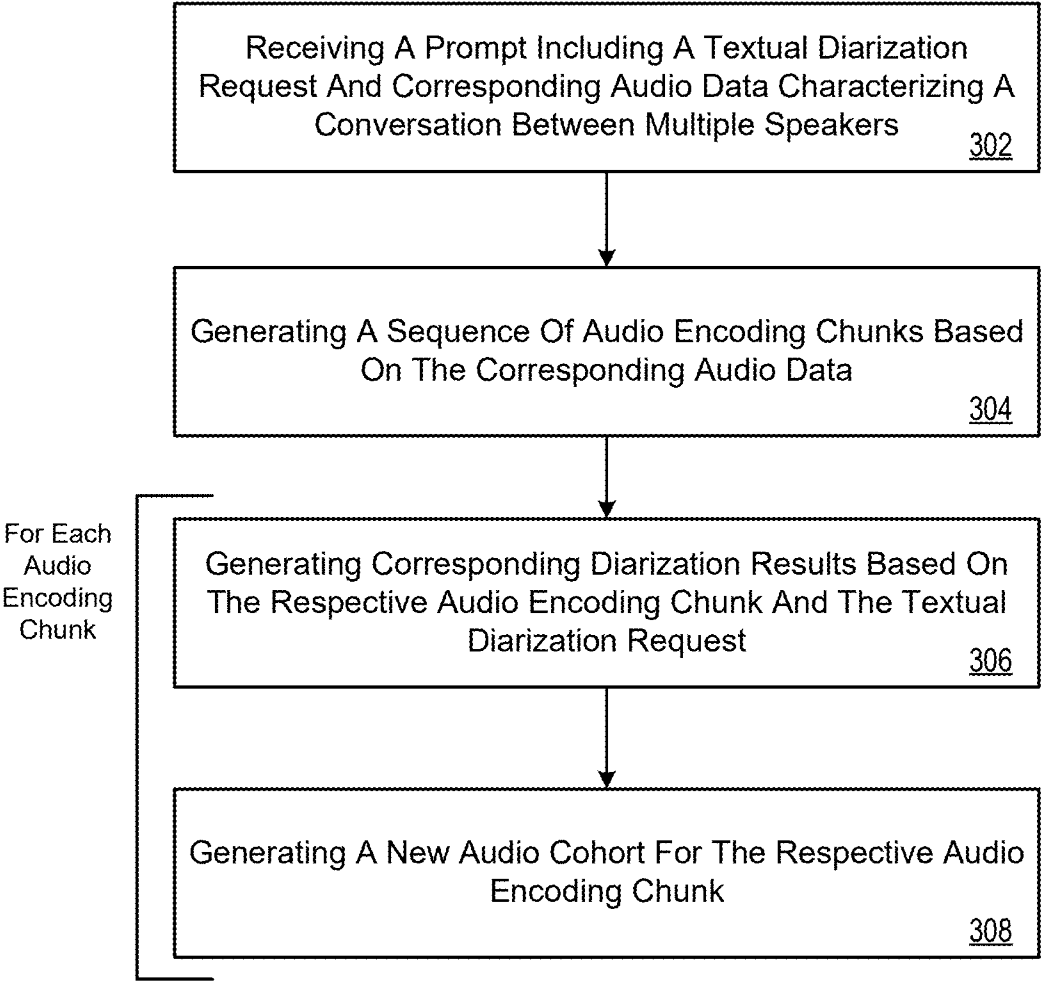

FIG. 3 includes a flowchart of an example arrangement of operations for a computer-implemented method 300 of performing longform speaker diarization by prompting a multimodal large language model. The method 300 may execute on data processing hardware 410 (FIG. 4) using instructions stored on memory hardware 420 (FIG. 4) that may reside on the user device 110 and/or the remote system 140 of FIG. 1 each corresponding to a computing device 400 (FIG. 4).

At operation 302, the method 300 includes receiving, as input to a joint speech recognition and speaker diarization model 150, a prompt 102 that includes a textual diarization request 104 and corresponding audio data 108 characterizing a conversation between multiple speakers 10. At operation 304, the method 300 includes generating, using a tokenizer 160 of the joint speech recognition and speaker diarization model 150, a sequence of audio encoding chunks 162 based on the corresponding audio data 108. For each respective audio encoding chunk 162 of the sequence of audio encoding chunks 162, the method 300 performs operations 306 and 308 using a trained LLM 170. At operation 306, the operations include generating corresponding diarization results 175 based on the respective audio encoding chunk 162 and the textual diarization request 104. The corresponding diarization results 175 includes a speech recognition result 120 that includes one or more predicted terms. Each respective predicted term is associated with a corresponding speaker token 122 representing a predicted identity of a respective speaker that spoke the respective predicted term. The trained LLM 170 is conditioned on a prior audio cohort 172 generated by the trained LLM 170 for a prior audio encoding chunk 162. At operation 308, the method 300 includes generating, based on the corresponding diarization results 175, a new audio cohort 172 for the respective audio encoding chunk 162.

Figure 4:
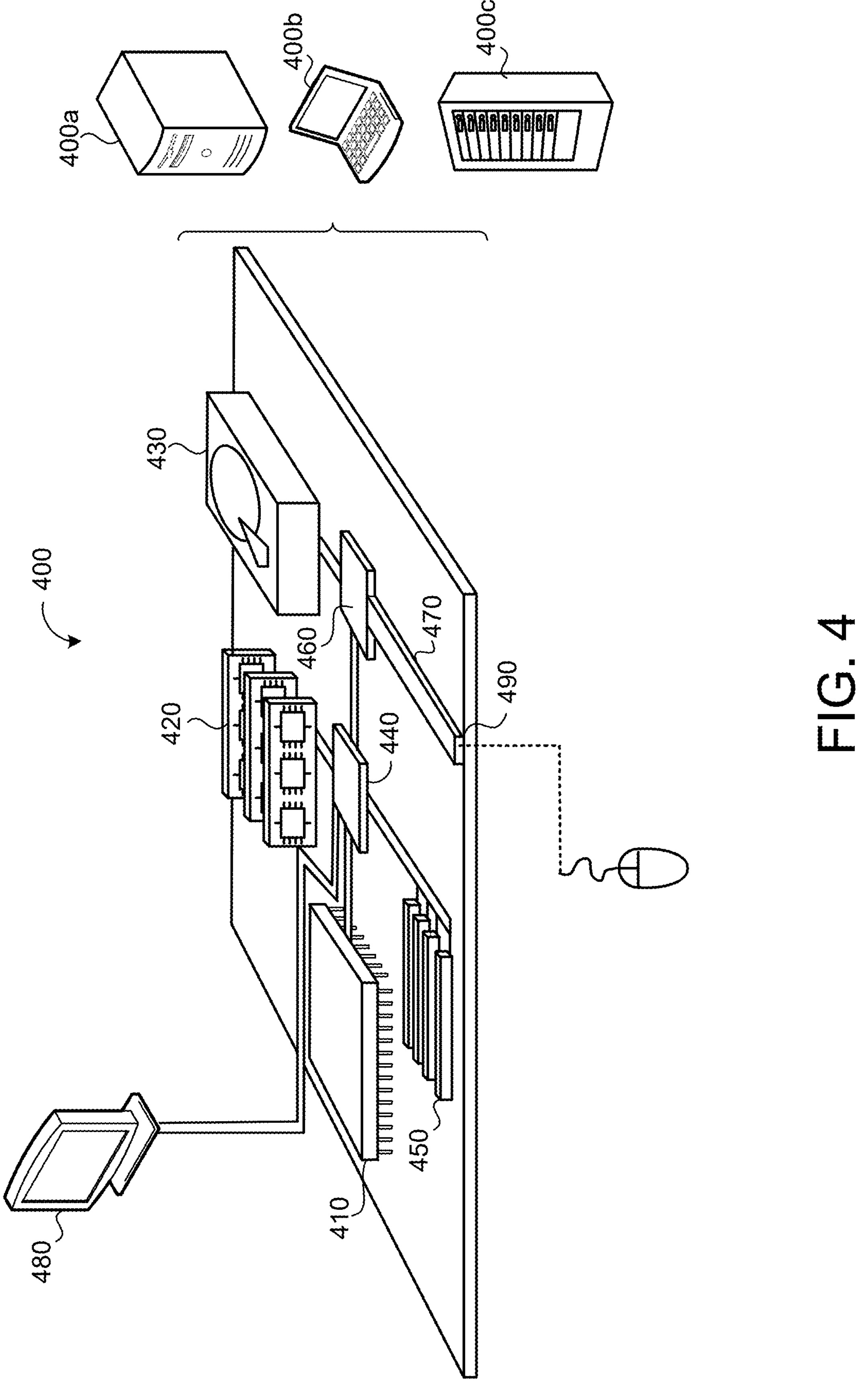
FIG. 4 is a schematic view of an example computing device that may be used to implement the systems and methods described herein.

FIG. 4 is a schematic view of an example computing device 400 that may be used to implement the systems and methods described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410, memory 420, a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400*a* or multiple times in a group of such servers 400*a*, as a laptop computer 400*b*, or as part of a rack server system 400*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A joint speech recognition and speaker diarization model comprising:

a tokenizer configured to:

receive a prompt comprising a textual diarization request and corresponding audio data characterizing a conversation between multiple speakers; and generate a sequence of audio encoding chunks based on the corresponding audio data; and a trained large language model (LLM) configured to, for each respective audio encoding chunk of the sequence of audio encoding chunks:

generate corresponding diarization results based on the respective audio encoding chunk and the textual diarization request, the corresponding diarization results comprising a speech recognition result that comprises one or more predicted terms, each respective predicted term associated with a corresponding speaker token representing a predicted identity of a respective speaker that spoke the respective predicted term, the trained LLM conditioned on a prior audio cohort generated by the trained LLM for a prior audio encoding chunk, the prior audio cohort providing reference audio data of one or more of the multiple speakers that spoke prior to the respective audio encoding chunk, wherein the trained LLM uses the prior audio cohort to determine whether the respective audio encoding chunk includes speech from any of the one or more speakers that spoke prior to the respective audio encoding chunk; and generate, based on the corresponding diarization results, a new audio cohort for the respective audio encoding chunk.

2. The joint speech recognition and speaker diarization model of claim 1, wherein each respective audio encoding chunk comprises multiple audio encodings.

3. The joint speech recognition and speaker diarization model of claim 1, wherein:

the tokenizer is further configured to generate a sequence of text encodings based on the textual diarization request; and generating the corresponding diarization results is further based on the sequence of text encodings.

4. The joint speech recognition and speaker diarization model of claim 1, wherein the new audio cohort comprises a matrix of audio speech snippets of one or more of the multiple speakers that spoke prior to the respective audio encoding chunk and during the respective audio encoding chunk.

5. The joint speech recognition and speaker diarization model of claim 1, wherein the trained LLM is only capable of generating textual outputs.

6. The joint speech recognition and speaker diarization model of claim 5, wherein the joint speech recognition and speaker diarization model further comprises an output layer configured to:

receive, as input, the corresponding diarization results;

determine timestamps between the speech recognition results and the speaker tokens; and generate the new audio cohort based on the timestamps between the speech recognition results and the speaker tokens.

7. The joint speech recognition and speaker diarization model of claim 1, wherein the trained LLM comprises a multimodal LLM.

8. The joint speech recognition and speaker diarization model of claim 1, wherein the trained LLM comprises frozen training parameters.

9. The joint speech recognition and speaker diarization model of claim 1, wherein the tokenizer comprises an audio encoder and a text encoder.

10. The joint speech recognition and speaker diarization model of claim 1, wherein the prior audio cohort includes associated text that instructs the trained LLM that the prior audio cohort includes speech samples to leverage during diarization.

11. A computer-implemented method executed on data processing hardware that causes the data processing hardware to perform operations comprising:

receiving, as input to a joint speech recognition and speaker diarization model, a prompt comprising a textual diarization request and corresponding audio data characterizing a conversation between multiple speakers;

generating, using a tokenizer of the joint speech recognition and speaker diarization model, a sequence of audio encoding chunks based on the corresponding audio data; and for each respective audio encoding chunk of the sequence of audio encoding chunks, using a trained large language model (LLM) of the joint speech recognition and speaker diarization model:

generating corresponding diarization results based on the respective audio encoding chunk and the textual diarization request, the corresponding diarization results comprising a speech recognition result that comprises one or more predicted terms, each respective predicted term associated with a corresponding speaker token representing a predicted identity of a respective speaker that spoke the respective predicted term, the trained LLM conditioned on a prior audio cohort generated by the trained LLM for a prior audio encoding chunk, the prior audio cohort providing reference audio data of one or more of the multiple speakers that spoke prior to the respective audio encoding chunk, wherein the trained LLM uses the prior audio cohort to determine whether the respective audio encoding chunk includes speech from any of the one or more speakers that spoke prior to the respective audio encoding chunk; and generating, based on the corresponding diarization results, a new audio cohort for the respective audio encoding chunk.

12. The computer-implemented method of claim 11, wherein each respective audio encoding chunk comprises multiple audio encodings.

13. The computer-implemented method of claim 11, wherein the operations further comprise:

generating, using the tokenizer, a sequence of text encodings based on the textual diarization request, wherein generating the corresponding diarization results is further based on the sequence of text encodings.

14. The computer-implemented method of claim 11, wherein the new audio cohort comprises a matrix of audio speech snippets of one or more of the multiple speakers that spoke prior to the respective audio encoding chunk and during the respective audio encoding chunk.

15. The computer-implemented method of claim 11, wherein the trained LLM is only capable of generating textual outputs.

16. The computer-implemented method of claim 15, wherein, using an output layer of the joint speech recognition and speaker diarization model, the operations further comprise:

determining timestamps between the speech recognition results and the speaker tokens; and generating the new audio cohort based on the timestamps between the speech recognition results and the speaker tokens.

17. The computer-implemented method of claim 11, wherein the trained LLM comprises a multimodal LLM.

18. The computer-implemented method of claim 11, wherein the trained LLM comprises frozen training parameters.

19. The computer-implemented method of claim 11, wherein the tokenizer comprises an audio encoder and a text encoder.

20. The computer-implemented method of claim 11, wherein the prior audio cohort includes associated text that instructs the trained LLM that the prior audio cohort includes speech samples to leverage during diarization.

* * * * *